G. C. COOLIDGE.
MILK PAIL.
APPLICATION FILED SEPT. 6, 1921.

1,428,475.

Patented Sept. 5, 1922.
2 SHEETS—SHEET 1.

Guy C. Coolidge INVENTOR

G. C. COOLIDGE.
MILK PAIL.
APPLICATION FILED SEPT. 6, 1921.

1,428,475.

Patented Sept. 5, 1922.
2 SHEETS—SHEET 2.

WITNESSES
R. A. Thomas

Guy C. Coolidge INVENTOR
BY Victor J. Evans
ATTORNEY

Patented Sept. 5, 1922.

1,428,475

UNITED STATES PATENT OFFICE.

GUY CORTLAND COOLIDGE, OF SEATTLE, WASHINGTON.

MILK PAIL.

Application filed September 6, 1921. Serial No. 498,734.

*To all whom it may concern:*

Be it known that I, GUY C. COOLIDGE, a citizen of the United States, residing at Seattle, in the county of King and State of Washington, have invented new and useful Improvements in Milk Pails, of which the following is a specification.

This invention comprehends the provision of a milk pail cover constructed to accommodate itself to different size pails, and designed to strain the milk as it is delivered into the pail thereby freeing the milk of germs or other foreign matter.

One of the chief characteristics of the present invention is to provide a cover of the above mentioned character designed to provide a collecting chamber for the foreign matter separated from the milk, the cover being constructed from a single piece of material, and possessing simplicity of construction so that it can be manufactured and sold at a nominal cost.

Another object of the invention resides in the provision of what I term a protector for the foraminated part of the cover, which protects the same from dust and dirt when the cover is not in use, the protector being mounted upon the cover so that it can be swung to an out of the way position when the cover is associated with the pail.

The nature and advantages of the invention will be better understood when the following detailed description is read in connection with the accompanying drawings, the invention residing in the construction, combination, and arrangements of parts as claimed.

In the drawings forming part of this application, like numerals of reference indicate similar parts in the several views and wherein:—

Figure 1:
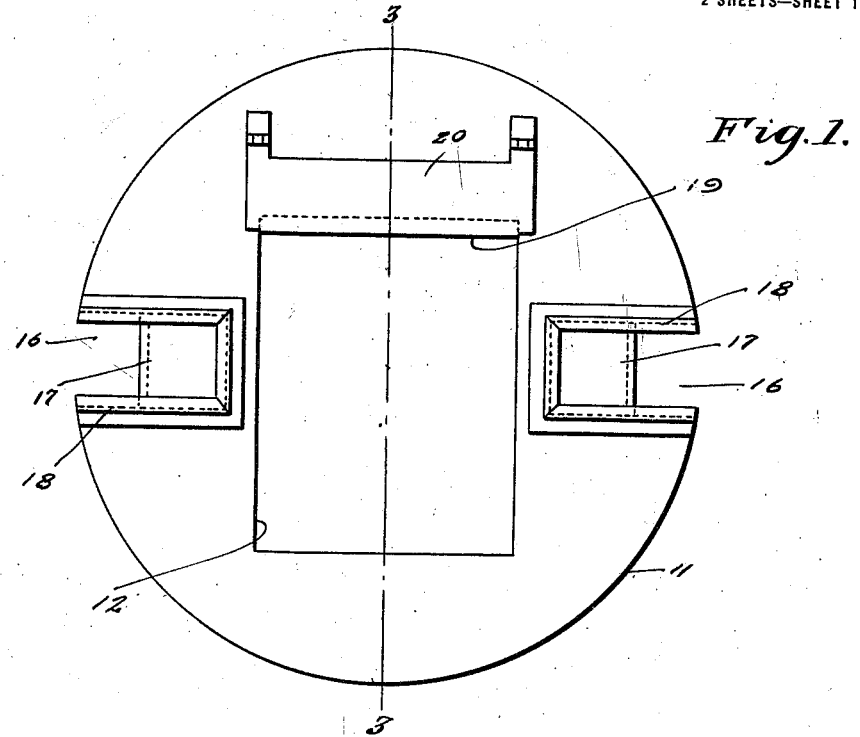
Figure 1 is a plan view of the cover constructed in accordance with the present invention.

Referring to the drawings in detail, 10 indicates a milk pail which may be of any suitable construction, the cover of which being indicated at 11. This cover is constructed from any suitable material and of any suitable size, and is cut away to provide an enlarged central opening 12 from which depends what I term a combined spout and sediment collecting chamber. This member includes an inclined wall 13 which projects from one edge of the opening 12, from the lower end of this wall rises a foraminated wall 14 which is connected with the opposed edge of the opening 12 as clearly illustrated. The opposite edges of the inclined wall 13 are connected to the cover by means of side walls 15, and as clearly illustrated, the spout and collecting chamber is of substantially V-shaped formation. The cover 11 is cut away at diametrically opposite points as at 16 to accommodate the ears of the pail 10 when the parts are associated, while supported upon the cover above these cut away portions are slides 17 which may be adjusted so that the cover will accommodate itself to pails of different sizes. The slides 17 move in guides 18. It will be noted that the cover in its entirety is constructed from a single piece of material which fact coupled with its simplicity of construction makes it possible to manufacture and sell the cover as an article for a very nominal cost.

Figure 2:
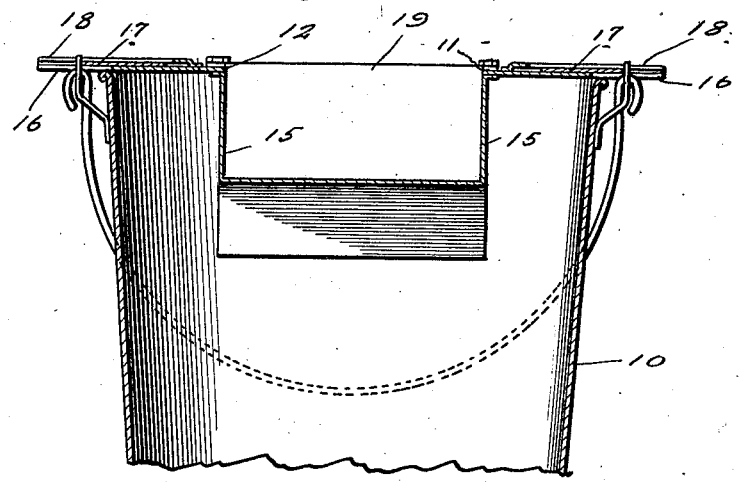
Figure 2 is a vertical sectional view through a pail with the cover applied.
Figure 3:
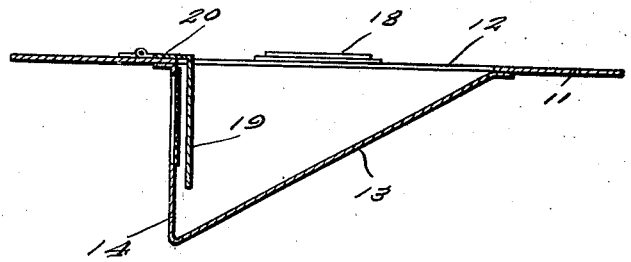
Figure 3 is an enlarged transverse sectional view taken on line 3—3 of Figure 1.
Figure 4:
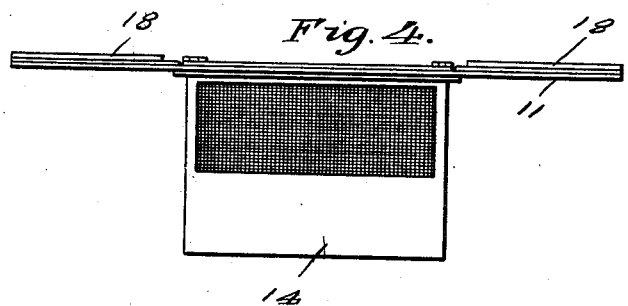
Figure 4 is an edge elevation of the cover, showing the foraminated portion.
Figure 6:
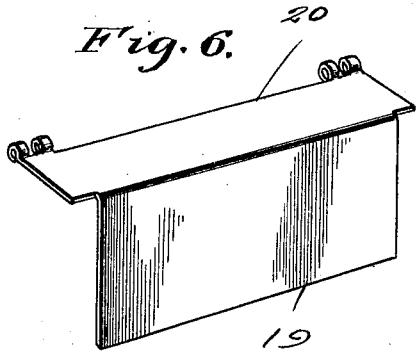
Figure 6 is a perspective view of the protector.

In practice, the cover is positioned upon the pail 10 in the manner illustrated in Figure 2, and the milk delivered to the pail is first received by the combined spout and sediment collecting chamber above described. The inclined wall 13 directs the milk toward the foraminated member 14 through which the milk is strained prior to its entrance into the pail and thus separated from germs or any other foreign matter which may be contained in the milk. This sediment or foreign matter remains within the collecting chamber where it can be easily removed incident to the washing of the cover.

Figure 5:
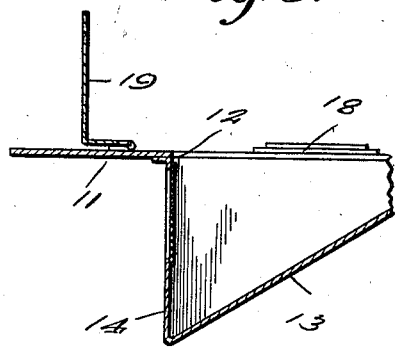
Figure 5 is a fragmentary view of the cover, showing the position of the protector when the cover is in use.

For the purpose of protecting the foraminated member 14 from dust and other foreign matter when the cover is not in use, I provide what I term a protector indicated at 19, the protector being in the nature of a plate of a size to cover the foraminated member 14 when the plate is passed through the opening 12 as shown. The protector 19 includes an attaching flange 20 which is hingedly mounted upon the cover 11 so that when the cover is in use, the protector can be swung to an out of the way position as illustrated in Figure 5.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

As a new and improved article of manufacture; a milk pail cover having an enlarged central opening, an inclined wall projecting downwardly from one edge of the opening and secured at its upper end thereto, a foraminated wall vertically arranged and rising from the lower end of said inclined wall and secured at its upper end to the opposite edge of the opening on the lower surface of said cover, vertically disposed side walls secured to the opposing side edges of the above mentioned walls and the side edges of the opening respectively, said walls formulating a substantially V-shaped chamber beneath said cover for the collection of foreign matter and the foraminated wall being adapted as an entrance to the pail, a plate adapted to normally cover the foraminated wall for protection thereof, a flange formed on said plate at a right angle thereto and designed to be hingedly secured to the upper surface of the cover adjacent the secured end of said foraminated wall and means associated with the edges of said cover to adjust the size thereof relatively to different size pails.

In testimony whereof I affix my signature.

GUY CORTLAND COOLIDGE.